3,492,203
EXTRACTION OF β-AMYLASE FROM WHEAT BRAN
Masakazu Mitsuhashi, Okayama-shi, Japan, assignor to Hayashibara Company, Ltd., Okayama-shi, Japan, a corporation of Japan
No Drawing. Filed July 5, 1966, Ser. No. 562,528
Claims priority, application Japan, July 8, 1965, 40/40,562
Int. Cl. C07g 7/02; C12d 11/00
U.S. Cl. 195—31    4 Claims

ABSTRACT OF THE DISCLOSURE

A pure β-amylase aqueous solution is prepared by extracting wheat bran with water at a temperature of 20° to 40° C. Maltose syrup is prepared by saccharifying a liquefield starch solution with the thus prepared β-amylase aqueous solution. The amount of water used to extract the bran is about 1 to 4 times the weight of the bran.

---

The present invention comprises the extraction of enzyme containing β-amylase as a principal component from wheat bran and saccharification of starch by the use of the said enzyme.

For saccharifying starch essential by hydrolysis, there is a process by the use of acid and a process by the use of malt extract. Components of acid saccharification product are dextrose, maltose, and other high molecular oligosaccharide, dextrin, and mixtures thereof. In the process of malt utilization, as an enzymatic source, so-called malt germinated from barley is used raw or dried. This enzyme contains α-amylase and β-amylase. The saccharified product obtained by the use of malt mainly contains maltose and a minor amount of dextrose and is considerably different from the former in view of the properties and the sweet taste. Moreover, the ingredients are difficult to be purified from the said product and are furbid, colored and odorous.

The object of the present invention is to provide a process of extracting pure β-amylase from wheat bran, saccharify starch and obtaining the saccharified substance, which contains the large amount of transparent, odorless maltose. Another object of the present invention is to provide a process for utilizing the inexpensive wheat bran. The third object of the present invention is to utilize further the bran extracted by water as a raw material of solid culture medium for microorganisms or as a mixed feedstuff.

According to the present invention, wheat bran is treated by water at the temperature of 20° C. to 40° C., the extraced solution containing β-amylase is obtained and the saccharification of starch is carried out thereby.

The wheat bran was treated by water without applying beforehand to pasteurization and this extracted solution was examined. The said extracted solution is found to contain the large amount of β-amylase in malt. And it was disclosed that the contained amount approximately corresponds to one-half of β-amylase contained in malt.

500 g. of various kinds of wheat brans steeped 4 times in warm water at 40° C. for 1.5 hrs. and centrifuged. The results of the activity tests of β-amylase on these extracted solutions are indicated in Table I.

TABLE I

| Wheat bran as raw material | Starch value (percent) | Total nitrogen (percent) | Activity of β-amylase, units/gr. |
|---|---|---|---|
| Canadian wheat [1] and American wheat [2] (1:) | 41 | 2.39 | 274 |
| Canadian wheat: | | | |
| A | 41.6 | 2.55 | 243 |
| B | 41.3 | 2.55 | 319 |
| C | 41.7 | 2.85 | 448 |
| E | 41.6 | 3.4 | 441 |
| Japan:Nisshin Seifun K.K. product (Trade Mark Flower brand) | 58.2 | 3.47 | 350 |
| Japan:Marusho Seifun K.K. product (Trade Mark AA mark) | 48.4 | 2.47 | 471 |

[1] Manitoba Wheat.
[2] Hard Winter; Western White.

The β-amylase activity is as follows.

Ml.
1% soluble starch solution _____ 5
M/10 acetic acid buffer solution: pH 5.0 ___ 4
Enzymatic solution _____ 1

The mixed solution of the above-mentioned composition was reacted for 30 minutes at 40° C., reduced sugar produced was determined quantitatively as maltose and enzyme value at the time of producing 10 mg. glucose was made 1 saccharification unit. Wheat bran materials are as follows:

Canadian Manitoba wheat
American Hardwinter
Nisshin Seifun (Flower brand): Mixture of Canadian product, American product and Japanese product.
Marusho Seifun (A.A. brand): Mixture of Canadian product, American product, and Japanese product.

As manifest in Table I activity values of β-amylase considerably varies in the wide extent by kinds of wheat bran, but are approximately equal to one half of those of malt amylase. The amount of water is appropriately equal or four times as large as amount of bran. If it is too large, an enzymatic solution becomes dilute. Furthermore, properties of enzyme of those extract solutions were investigated and the results are shown in Table II. In other words, the power to decompose it into maltose, is strong but the power to decompose starch into dextrine is entirely absent. Those are different from a malt enzyme on this viewpoint. Moreover, those do not have the decomposition power of maltose to glucose, so that those are different from a glucoamylase and can be said as a main component of β-amylase.

TABLE II

U./ml.
Saccharogenic activity _____ 95.8
Dextrinogenic activity _____ 0.53
Maltase activity _____ 0.14

Then, 0.2% of liquified enzyme (product of Hankyu Kyoei Bussan K.K.) was added in a starch emulsion of sweet potato having a specific gravity of 1.15 and the resultant mixture was adjusted in pH 6 and heated at a temperature of 80° to 90° C. The said resultant mixture was liquefied for 20 min. and thereby a liquefied solution having 13% of dextrose equivalent was obtained.

The units in Table II are as follows:

Saccharogenic activity

|  | Ml. |
|---|---|
| 1% of soluble starch | 5 |
| M/10 of acetic acid buffer solution | 4 |
| Enzymatic solution | 1 |

The reaction solution having the aforesaid composition is allowed to cause the reaction at 40° C. for 30 min. In accordance with Fehling Leham Schoorl method, the reducing sugar was uantitatively analyzed as glucose.

The enzymatic activity, under which 10 mg. of glucose was produced, is specified as one saccharifying unit.

Dextrinogenic activity

The reaction solution, having the same composition in the case of measuring the saccharification activity was reacted at 40° C. and in the lapse of time, 0.5 ml. of the solution was collected and put into the colorimetric tube (the inside diameter: 9 mm.) N/100 of the addition solution was added into 0.5 ml. of the said solution.

The time until the color indication of iodine was coincided with the standard red color was measured.

(Note: The color phase for N/10 of iodine solution was specified as the standard color.)

The enzymatic activity of changing the reaction solution in the reddish color for 10 min. under this condition was specified as one unit of dextrinogenic activity.

Maltase activity

|  | Ml. |
|---|---|
| 1% maltose liquid | 5 |
| N/10 acetic acid buffer solution (pH 4.5) | 4 |
| Enzymatic solution | 1 |

The said reaction solution was reacted at 40° C. for 30 min. and the reduced sugar was quantitatively analyzed.

The enzymatic activity by which 10 mg. of glucose was produced by this reaction condition was specified as one unit of maltase activity. One-half amount of the said liquefied solution was boiled and the effect of liquefied enzyme was deprived of (No. 1). The other half was not treated in such way as mentioned above (No. 2, No. 3 and No. 4).

Those were adjusted in pH of 4.8 to 5.0 and the said extract solutions, in 1 to 2 units in proportion to starch were added in them at 55° C. for exercising saccharification during 72 hours; and those resultant solutions were clarified by filtration and decolorized by powdered active carbons for producing high maltose syrup. The results are shown in Table III.

TABLE III

|  | No. 1 | No. 2 | No. 3 | No. 4 |
|---|---|---|---|---|
| Liquefying D.E. | 27.8 | 18.8 | 8 | 10 |
| Boiling Treatment | Treated | Untreated | Untreated | Untreated |
| Addition Amount of Extract Enzyme | (1) | (1) | (1) | (2) |
| Decomposition Rate (D.E.): |  |  |  |  |
| 24 hrs. (percent) | 47.3 | 46.2 | 48.6 | 44.8 |
| 48 hrs. (percent) | 48.3 | 47.9 | | 48.2 |
| 72 hrs. (percent) | 48.5 | 47.9 | | |
| Coloration Degree of solution (Extinction coefficient, log T) | 0.190 | 0.125 | 0.197 | 0.138 |
| Addition of active carbon (percent/solid component) | 0.6 | 0.6 | 0.3 | 0.3 |
| Coloration Degree (−log T) | 0.037 | 0.033 | 0.05 | 0.022 |
| Coloration degree (−log T) after-treated with ion exchange resin (A mixture of one part of Amberlite IR-120 and two parts of Amberlite IRA-411) | 0.001 | 0.001 | 0.001 | 0.001 |
| Electric specific resistance (Ω cm.) | 5×10⁵ | 5×10⁵ | 5×10⁵ | 5×10⁵ |

[1] 2 units per starch (gram).
[2] 1 unit per starch (gram).

The saccharified solution produced by the present invention contains a smaller amount of dextrose and oligosaccharid in higher molecule than maltotriose and a principal component of maltose, so that it has a different composition from an acid saccharified starch sugar and is different from the strach sugar in view of sweet taste and viscosity.

Comparison of filtering velocity (Filterpress)

Diatomaceous earth, a product of Showo Kogaku K.K., Special-flow, was used, and 0.2% of the product was added in the said solution.

|  | Filtration Temperature (° C.) | Maximum filtering pressure (kg./cm.²) | Average amount o, filtrationf l./m.² hr. |
|---|---|---|---|
| Starch syrup converted with meat extract | 75 | 5.5 | 300 |
| Starch syrup converted with present enzyme | 75 | 1.5 | 1,700 |

Purification by ion exchange

The said solution was decolored by active carbon and a mixture of one part of Amberlite IR-120 and two parts of Amberlite IRA-411 was used.

Malt starch sugar (35% solution) ———— Purified solution volume is 10 times volume of IR-120. The electric resistance was depressed and the color leaked. Electric specific resistances is $7 \times 10^3$ Ω cm. Coloration degree is 0.1 (−log T).

Saccharified solution by the present enzyme (35% solution) ———— Electric specific resistance is $50 \times 10^4$ Ωcm. Coloration degree is 0.1 or less (−log T).

The extracted residue, which remained after the enzyme consisting of main ingredient of β-amylase was extracted, is confirmed to be suitably used for solid culture of microorganism, e.g. Rhizopus, or Aspergils on the culture media of the bran or feedstuff of domestic animals. The extract residue of wheat bran is diminished by 10–20% amount. So, approximately 50% of new bran is mixed with the said extract residue and a total moisture content of the resultant mixture is adjusted as an optimum moisture for cultivation and the resultant mixture is steam-sterilized by a common process and the microorganisms are inoculated on it for cultivation, whereby the enzyme can be produced in 3 to 4 days, in the equal or very close grade that non-extract brands are used.

*Rhizopus formosensis* was cultured on this culture medium and the saccharifying activity was tested on the produced enzyme. The results are shown in Table IV. In this experiment non-extract wheat bran and extract residue of wheat bran were blended with a mixture of an extract residue of wheat bran and a 40% of non-extract wheat bran, and the resultant mixture was adjusted to 48% of moisture content, 16.5 g. of the said resultant mixture were put in the 200 ml. capacity of conical flask and was packed with a cotton plug and sterilized in the pressure by a common process. Then, Rhizopus No. 47 in one platinum loop was inoculated on this culture medium for exercising the cultivation at 28° C. to 30° C.; and the culture media in laspe of the second day, the third day and the fourth day were added respectively with 100 ml. of warm water. Those were left unmoved for 1.5 hours at a room temperature of 28° C. to 30° C. and then were filtered for obtaining the extract solution. The comparison of saccharifying activity was made on the said extract solutions.

TABLE IV.—SACCHAROGENIC ACTIVITY
[Unit/Bran in gram]

|  | 2nd Day | 3rd Day | 4th Day |
|---|---|---|---|
| Wheat bran | 165.2<br>155.2 | 184.4<br>184.4<br>176.4 | 169.2<br>167.2<br>165.2 |
| Average | (160.2) | (181.7) | (167.2) |
| Extract residue of wheat bran | 139.6<br>135.6 | 164.8<br>154.8<br>154.8 | 179.6<br>179.6<br>177.6 |
| Average | (137.6) | (158.1) | (178.9) |
| Extract residue of wheat bran and wheat bran. | 146.8<br>146.8 | 182.0<br>180.0<br>176.0 | 193.2<br>189.2<br>185.2 |
| Average | (146.8) | (179.3) | (189.2) |

This extract saccharogenic enzyme in the amount of four units per gram of starch was added in a liquefied sweet potato starch slurry having a decomposition rate (D.E.) of 5% to 10%; and the resultant solution was adjusted at pH of 5 and saccharified during 48 hrs. at 55° C. and thereby a dextrose solution having a decomposition rate (D.E.) of 98% was obtained. The above dextrose solution was purified and crystallized and the refined dextrose was obtained.

Examples of the present invention are illustrated as follows:

EXAMPLE 1

Four times as much amount as warm water at 40° C. was added in 500 g. of wheat bran obtained from Canadian wheat and the resultant solution was lixiviated and then dehydrated centrifugally, whereby 890 g. of extract residue (moisture content: 62.5% and dried substance: 383.8 g.) and 1550 ml. of extract liquid (dried substance: 89.7 g. enzyme activity S.A 105 unit/ml.) were obtained. On other hand, 0.4% of oxalic acid in proportion to the amount of starch was added in the emulsion of sweet potato refined starch in 1.15 of specific gravity. The resultant mixture was converted in a liquefied solution having 25 of D.E. under one atmospheric pressure and for 15 minutes. The said liquefied solution was neutralized by calcium carbonate to 5.2 of pH, and the said enzyme solution 2 units/g. starch was added to it for exercising the saccharification in 5 of pH and for 24 hours at 55° C. and a saccharified solution having 51 of D.E. was obtained. The said saccharified solution was decolored by "Carboratine," a product of Takeda Kagaku K.K., and 0.2% of the "special-flow," a filter aid of filtration. A product of Showa Kagaku K.K. was added in the said solution. This solution was decolorized by active carbon and then was purified through ion exchange resin (tradename: Amberlite IR–128, IR–68 and IR–120, IR–411 in mixture) and there was produced a clarified saccharified solution in high purity, containing a large amount of colorless maltose.

The results for analysis of saccharified solution are as follows:

D.E. (Dextrose equivalent) _____ 50
Photo-absorption for 40% solution —log T ____ 0.01
Electric specific resistance for 40% solution
   (Ωcm.) _____ 50×10⁴

Composition of Sugar components is as follows:

EXAMPLE 2

Saccharification: 0.2% (in proportion to the unit of starch) of subtilis liquefied enzyme (product of Kyoei Bussan K.K.) was added in the purified starch emulsion of sweat potato having 1.15% specific gravity. The resultant mixture was adjusted at 6.0 of pH and heated rapidly at a temperature of 80° C. to 90° C. for liquefaction. The reaction was allowed to proceed at 85° C. for 20 min. As the decomposition rate (D.E.) is specified in the range of 20% to 25%. The liquefied solution was cooled to a temperature of 60° C. to 50° C. and saccharified and purified as Example 1.

Purification: The filtering test was exercised for the above saccharified solution. For the sake of comparison, malt saccharified sugar was used. It was difficult to filter the malt saccharified sugar and it was not possible to carry out purification, decoloration and filtration, so that the purified product cannot be obtained.

|  | Maximum filtering pressure (kg./cm.²) | Average quantity of flow, l./m.² hr. |
|---|---|---|
| Malt saccharified liquid | 5.5 | 300 |
| Saccharified liquid by the present enzyme | 4.5 | 1,500 |

Composition of sugar components in the present saccharified solution is as follows:

|  | Percent |
|---|---|
| Glucose | 5 |
| Maltose | 49 |
| Malttriose | 19 |
| Malttetraose | 5 |
| Dextrin | 22 |

Electric specific resistance and photo-adsorption were identified similarly as Example 1.

The process for treating the saccharified solution was similar as Example 1.

EXAMPLE 3

Wheat bran is mixed with water in an equal amount and this mixture was filled in a cylindrical extracting tower. From the top of tower, the water at a temperature of 20° C. to 40° C. was sprayed and fed into the tower and after 10 hrs., the solution in the lower natural flow was increased two times the amount of the bran, i.e. 200 units per ml.

What is claimed is:

1. A process for producing a pure β-amylase aqueous solution, which comprises steeping wheat bran in water at a temperature of 20° to 40° C. for a substantial time to extract β-amylase therefrom, separating the water containing β-amylase from the wheat bran, and retaining said β-amylase.

2. A process according to claim 1, wherein the amount of water used to extract the bran is about one to four times the weight of said bran.

3. A process for producing maltose syrup which comprises extracting wheat bran with water at a temperature of 20° to 40° C. thereby to prepare a pure β-amylase

|  | Glucose | Maltose | Malttriose | Tetraose | Dextrin |
|---|---|---|---|---|---|
| High maltose syrup produced by the present process D.E. 50, percent | 7 | 47 | 17 | 5 | 24 |
| Corn syrup produced by acid saccharification D.E. 50, percent | 26 | 17 | 13 | 10 | 34 | aqueous solution and saccharifying a liquefied starch solution with the thus obtained β-amylase aqueous solution.

4. A process according to claim 3, wherein the amount of water used to extract the bran is about one to four times the weight of said bran.

References Cited

UNITED STATES PATENTS 2,891,869  6/1959  Langlois _____ 195—131 X

OTHER REFERENCES

Tipples et al.: Article entitled "Wheat Beta-Amylases" in Cereal Chemistry, vol. 42, No. 2 (March 1965), pp. 111–124, pp. 111 and 112 relied on.

LIONEL M. SHAPIRO, Primary Examiner

U.S. Cl. X.R.

195—66